Jan. 28, 1936.  E. W. KELLOGG  2,029,027
STRIP RECORD SUPPORTING AND DRIVING APPARATUS
Filed July 2, 1932
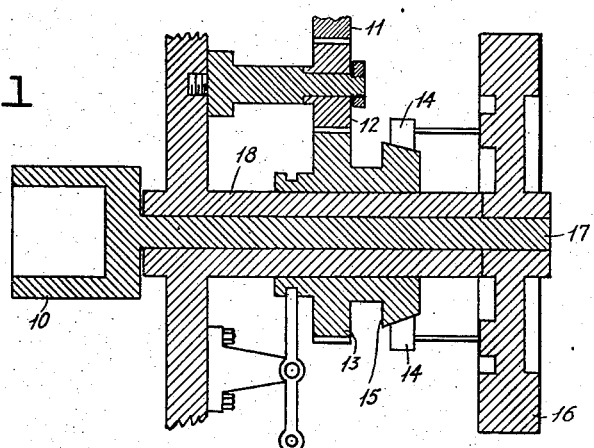
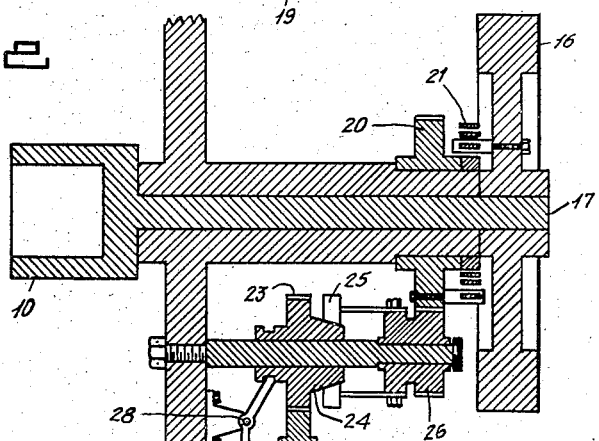
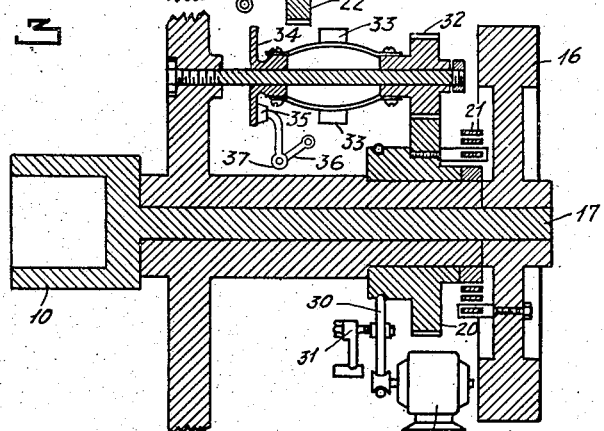
INVENTOR
EDWARD W. KELLOGG
BY
ATTORNEY Patented Jan. 28, 1936

2,029,027

UNITED STATES PATENT OFFICE 2,029,027

STRIP RECORD SUPPORTING AND DRIVING APPARATUS

Edward W. Kellogg, Moorestown, N. J., assignor to Radio Corporation of America, a corporation of Delaware Application July 2, 1932, Serial No. 620,689

9 Claims. (Cl. 271—2.3)

This invention relates to strip record supporting and driving apparatus such as may be utilized for recording sound photographically on a film and for reproducing sound from a film record.

It has for its principal object the provision of an improved apparatus and method of operation whereby the film may be moved at substantially uniform speed irrespective of brief variations in the speed of the driving system and whereby tendency of the rotational parts to oscillate at at a frequency dependent on their natural vibration period may be overcome.

A further object is the provision of a film supporting and film drive mechanism wherein the principle of a fly-ball type governor is utilized to stabilize the film speed.

I have shown my invention as applied to a device in which the film is supported and progressed by a rotating cylindrical surface. While it is preferable that the record be made on the film, or reproduced therefrom, at a point within the arc of contact between the film and the said rotating cylindrical surface, my invention is equally applicable to devices wherein the support of the film at the recording or reproducing point is otherwise provided, as for example by a gate or skid.

The present invention is particularly concerned with the provision of inexpensive means for producing uniform motion of the film. The movement of film produced by a sprocket, the sprocket being driven through gears or belts or both from a motor, is not sufficiently steady for satisfactory reproduction of music even though the motor speed be constant. Imperfections in gears and joints in belts cause changes in sprocket speed. It is difficult to obtain a sprocket which is sufficiently free from inaccuracies, and finally even a perfectly formed sprocket running at constant speed would not produce uniform film motion unless the pitch of the film perforations is exactly equal to the sprocket tooth pitch, a condition which is rarely met owing to the varying shrinkage of films. As a means of improving the steadiness of film motion, use has been made of a smooth, cylindrical drum on the shaft of which is a flywheel, the film being held against the drum by one or more pressure rollers. The film is pulled by the sprocket and the tension on that part of the film between the drum and the sprocket causes the drum and flywheel to rotate. This arrangement is helpful but a practical difficulty arises. If a very light flywheel is used, the drum runs easily but the flywheel effect is inadequate. As the size of the flywheel is increased the bearing friction becomes greater and the film tension is increased. The tighter the film, the more forcibly it transmits jerks from the sprocket to the drum and the result is that even the large flywheel undergoes objectionable accelerations, or else the film slips on the drum, either of which defeats the purpose sought.

One method which has been employed to reduce the violence of jerks on the film is to pass the film over a spring-supported roller arranged between the drum and the sprocket. While such an arrangement is advantageous in increasing the flexibility, it has been found that under certain conditions another difficulty is encountered, namely that known as "hunting". In a prior application, Serial No. 295,780, filed July 27, 1928, is disclosed an apparatus wherein an auxiliary magnetic drive is utilized to damp the tendency to oscillate or hunt and to relieve the film of a large part of the work of driving the flywheel or inertia element which is utilized to stabilize the film speed. In this arrangement the speed of the drum support must be able to adjust itself in accordance with shrinkage of the film. When the film is shrunk and lower speed is needed the slip between the magnetic drive and the flywheel increases, the magnetic drive supplying slightly more torque and the film slightly less torque. The property of this auxiliary drive which is essential for proper drum speed adjustment and for damping out oscillations is that the torque supplied by the auxiliary drive should increase continuously with increasing slip. The function of the arrangement described by the aforesaid application is entirely satisfactory from an operational viewpoint, but has the disadvantage that it is somewhat expensive to construct.

In accordance with the present invention, the necessary continuous change of drag with slip is obtained by employing the principal of a fly-ball type governor. In its simplest form this arrangement involves the mounting of several weights on the flywheel by means of springs and providing the ends of the springs with shoes which bear on a cylinder driven somewhat faster than the flywheel. When the flywheel is stationary, the shoes are pressed with full force against the driving cylinder and a relatively strong torque is exerted to accelerate the flywheel. As the flywheel speeds up, the pressure of the shoes on the cylinder is decreased by the fly-ball governor action and the torque supplied to the flywheel is correspondingly decreased. In order to make the driving torque adjustable the over-driven element may be made conical so as to permit it to be adjusted axially.

If the film drum speed is low, it is desirable to have the fly-ball device run at a higher speed. It may be geared to the flywheel and, if desired, a filtering spring may be arranged to communicate torque from a driving gear which is concentric with the flywheel. Under these conditions, the damping or anti-hunting properties of the governor will still be effective although slightly less so than without the spring. One of the advantages of gearing up the governor is that variations in friction during one revolution of the governor occur at a high frequency and, therefore, will effect flywheel speed less.

The invention will be better understood from the following description when considered in connection with the accompanying drawing, and its scope will be pointed out in the appended claims.

Referring to the drawing,

Fig. 1 is a sectional view of a device wherein the fly-ball element is mounted on the flywheel, Fig. 2 is a sectional view of a modified arrangement wherein the flywheel is driven through a resilient coupling and the fly-ball device is mounted on a gear rotated at a speed somewhat higher than that of the flywheel, and Fig. 3 shows a modified film drive apparatus which differs from that of Fig. 2 more particularly with respect to the arrangement of the fly-ball frictional element.

The apparatus illustrated by Fig. 1 includes a film drum 10 which is driven by a gear 11 through gears 12 and 13, a frictional coupling including fly-ball members 14 and a conical friction drum 15 with which these members cooperate, and a flywheel 16 which is mounted on the same shaft 17 as the drum 10. For the purpose of adjusting the drive torque exerted through the frictional coupling between the cone 15 and the fly-ball members 14, the conical member 15 and the gear 13 are arranged to slide axially on a fixed bushing 18 surrounding the shaft 17, this adjustment being made by a pivoted control member 19 which cooperates with a groove in the gear hub as illustrated.

It will be readily understood that the flywheel 16 and the drum 10 are subjected to a torque dependent both on the flywheel speed and on the adjustment of the member 19. This torque is, of course, a maximum when the flywheel is stationary and is a minimum at the maximum speed of the flywheel. At intermediate speeds the driving torque is dependent on the flywheel speed.

The apparatus illustrated by Fig. 2 differs from that of Fig. 1 in that the flywheel 16 is coupled to a gear 20 through a resilient coupling 21, and in that driving torque is supplied to the gear 20 through a gear 22, a gear 23 provided with conical surface 24 and fly-ball elements 25 which are mounted on a gear 26 arranged to mesh with the gear 20. Adjustment of the torque exerted through frictional coupling 24—25 is effected by a control lever 27 which is pivoted at 28 and arranged to cooperate with a groove in the hub of the gear 23.

As previously indicated, this modification of the invention has the advantage that the frictional surfaces operate at a speed which is relatively high with respect to that of the flywheel 16 and the variations in frictional torque occur at such a high frequency that their effect on the flywheel speed is minimized or substantially obviated.

Another advantage of operating the fly-ball members at higher rotational speed is that the centrifugal force is thereby greatly increased and it becomes much easier to secure the desired control without resort to heavy fly-balls.

The modification illustrated by Fig. 3 differs from that of Fig. 2 in that driving torque is supplied directly from a motor 29 to the hub of the gear 20 through a belt 30, means 31 being provided for the purpose of adjusting the tension of this belt. The belt is designed to slip continuously thus providing a uniform but adjustable forward torque. Since the belt is dry the frictional torque is not dependent on relative speed and the belt friction does not provide damping. Damping torque for the suppression of oscillations is supplied to the gear 20 through a gear 32, fly-ball members 33 and a disc 34 arranged to engage a frictional element 35 mounted on a control member 36 which is pivoted at 37. In this modification of the invention as in that illustrated by Fig. 2 the frictional variations due to imperfections in the sliding elements occur at a relatively high speed so that their effect on the speed of the flywheel is minimized. Damping out of oscillations results from the properties of the governor by which any increase in speed of the flywheel 16 results in an increase in the braking effect of the governor. In operation the forward torque supplied through the belt is balanced against the frictional losses in the mechanism plus the retarding drag of the governor, in such a way that the film has very little forward or retarding force to supply, and therefore operates with slack loops and does not transmit any appreciable disturbances from the sprockets to the drum. The adjustment may be made either by means of the belt tightener 31 or of the governor control device 36.

It is obvious that the variation in friction by which the governor controls the torque, or by which the adjustment of torque is made, may depend on changes in the pressure between the rubbing surfaces, as in the arrangements illustrated in Figures 1, 2 and 3, or the friction torque may be varied by varying the radius from the axis of rotation at which a brake shoe is applied, or the friction may be varied by altering the area of contact between the rubbing surfaces, as for example by changing the overlap between a stationary and a moving surface. The last mentioned method of controlling the magnitude of the friction, is especially effective if the surfaces are oily or greasy. Control by change of pressure on the other hand is most effective if the surfaces are substantially unlubricated. Control by change of radius is effective whether the surfaces are lubricated or not.

It will be readily understood that the various forms of the invention may be utilized for driving any type of record where a very uniform speed is required and that they have particular utility in the recording and reproduction of sound from a strip record such as a photographic film.

I claim:

1. The combination of a film support, driving means for moving said film, inertia means arranged to move with said support, and a variable-friction coupling interposed between said driving means and said support, whereby a frictional driving torque dependent on the speed of said inertia means is imparted to said support.

2. The combination of a film support, driving means for said support, inertia means arranged to move with said support, and means for causing said driving means to apply to said support a frictional driving torque dependent on the speed of said inertia means.

3. The combination of a film drum, inertia means rigidly coupled to said drum, driving means actuated at a greater speed than the inertia means, and a fly-ball coupling interposed between said driving means and said drum.

4. The combination of a film drum, inertia means rigidly coupled to said drum, driving means, a fly-ball coupling interposed between said driving means and said drum, and arranged to be driven at a speed higher than that of said drum.

5. The combination of a record support, inertia means arranged to move with said support, driving means, a speed responsive frictional coupling interposed between said driving means and said support, and means for adjusting the torque transmitted through said coupling.

6. The combination of a film drum, inertia means arranged to move with said drum, driving means, and speed responsive frictional means arranged to control the torque applied by said driving means to said drum during normal operation.

7. The combination of a record support, inertia means arranged to move with said support, driving means actuated at a greater speed than the inertia means, a resilient coupling between said driving means and said support, and speed responsive frictional means arranged to control the torque applied through said resilient coupling.

8. The combination of a record support, inertia means arranged to move with said support, driving means actuated at a greater speed than the inertia means, a resilient coupling between said driving means and said support, speed responsive frictional means arranged to control the torque applied through said resilient coupling, and means for adjusting the influence of said frictional means.

9. The combination of a record support, driving means therefor, and adjustable speed responsive friction means whereby the torque supplied to the record support by said driving means can be controlled.

EDWARD W. KELLOGG.